United States Patent
Luciano, Jr. et al.

(10) Patent No.: US 9,339,715 B2
(45) Date of Patent: May 17, 2016

(54) RADAR BASED TRACKING SYSTEM FOR GOLF DRIVING RANGE

(71) Applicants: Robert A. Luciano, Jr., Reno, NV (US); David Grieshaber, Brisbane, CA (US)

(72) Inventors: Robert A. Luciano, Jr., Reno, NV (US); David Grieshaber, Brisbane, CA (US)

(73) Assignee: EDGE TECHNOLOGY, Reno, NV (US)

( * ) Notice: Subject to any disclaimer, the term of this patent is extended or adjusted under 35 U.S.C. 154(b) by 0 days.

(21) Appl. No.: 13/804,899

(22) Filed: Mar. 14, 2013

(65) Prior Publication Data

US 2013/0274025 A1 Oct. 17, 2013

Related U.S. Application Data

(63) Continuation-in-part of application No. 13/212,850, filed on Aug. 18, 2011, and a continuation-in-part of application No. 13/212,885, filed on Aug. 18, 2011, application No. 13/804,899, which is a continuation-in-part of application No. 13/277,940, filed on Oct. 20, 2011, and a continuation-in-part of (Continued)

(51) Int. Cl.
| | |
|---|---|
| *G08B 13/14* | (2006.01) |
| *G07C 1/24* | (2006.01) |
| *G01C 17/00* | (2006.01) |
| *A63F 7/20* | (2006.01) |
| *A63B 71/00* | (2006.01) |
| *A63F 9/24* | (2006.01) |
| *A63B 67/02* | (2006.01) |
| *A63B 57/00* | (2015.01) |
| *A63B 69/36* | (2006.01) |
| *G01S 13/75* | (2006.01) |
| *G01S 13/87* | (2006.01) |

(Continued)

(52) U.S. Cl.
CPC ............ *A63B 69/3658* (2013.01); *G01S 13/751* (2013.01); *G01S 13/878* (2013.01); *G06K 19/04* (2013.01); *H04B 5/0031* (2013.01); *H04B 5/0062* (2013.01); *H04Q 9/00* (2013.01); *H04Q 2209/47* (2013.01)

(58) Field of Classification Search
CPC ........................................................ G08B 13/14
USPC ........................................................ 340/572.1
See application file for complete search history.

(56) References Cited

U.S. PATENT DOCUMENTS

| | | | | |
|---|---|---|---|---|
| 3,369,812 | A | * 2/1968 | McKee | ............... A63B 69/3697 473/192 |
| 3,828,353 | A | 8/1974 | Majkrzak et al. | |

(Continued)

FOREIGN PATENT DOCUMENTS

| | | |
|---|---|---|
| GB | 2446212 A | 6/2006 |
| JP | 8224331 | 9/1996 |
| JP | 2013154176 A | 8/2013 |

*Primary Examiner* — Jennifer Mehmood
*Assistant Examiner* — John Mortell
(74) *Attorney, Agent, or Firm* — Michael A. Kerr; Kerr IP Group, LLC

(57) ABSTRACT

A golf ball range target system that includes a golf target, a golf ball dispenser, at least one golf ball, a target sensor, a tracking module, and a client computer is described. The golf target has a known geographic location and includes at least one golf target area. The golf ball dispenser houses golf balls. Each golf ball is associated with a particular player. The tracking module determines a golf ball flight trajectory for the golf ball associated with the particular player. The target sensor determines whether the golf ball has landed in a target area.

21 Claims, 11 Drawing Sheets

Related U.S. Application Data application No. 13/444,652, filed on Apr. 11, 2012, and a continuation-in-part of application No. 13/444,660, filed on Apr. 11, 2012, and a continuation-in-part of application No. 13/444,679, filed on Apr. 11, 2012, and a continuation-in-part of application No. 13/655,853, filed on Oct. 19, 2012, and a continuation-in-part of application No. 13/655,882, filed on Oct. 19, 2012.

(60) Provisional application No. 61/766,646, filed on Feb. 19, 2013, provisional application No. 61/375,555, filed on Aug. 20, 2010, provisional application No. 61/374,713, filed on Aug. 18, 2010.

(51) Int. Cl.
  *G06K 19/04* (2006.01)
  *H04Q 9/00* (2006.01)
  *H04B 5/00* (2006.01)

(56) References Cited

U.S. PATENT DOCUMENTS

| | | | |
|---|---|---|---|
| 3,889,957 A | 6/1975 | Klabacka | |
| 4,816,836 A | 3/1989 | Lalezari | |
| 4,979,739 A | 12/1990 | Allen et al. | |
| 5,102,140 A | 4/1992 | Vincent | |
| 5,114,155 A | 5/1992 | Tillery et al. | |
| 5,370,389 A | 12/1994 | Reising | |
| 5,439,224 A | 8/1995 | Bertoncino | |
| 5,505,457 A | 4/1996 | Boylan et al. | |
| 5,513,841 A | 5/1996 | Takagi | |
| 5,626,531 A | 5/1997 | Little | |
| 5,674,130 A * | 10/1997 | Egan | A63B 57/0006 473/132 |
| 5,743,815 A | 4/1998 | Helderman | |
| 5,821,525 A | 10/1998 | Takebayashi | |
| 5,910,057 A | 6/1999 | Quimby et al. | |
| 5,949,679 A | 9/1999 | Born et al. | |
| 6,148,271 A | 11/2000 | Marinelli | |
| 6,322,455 B1 | 11/2001 | Howey | |
| 6,569,028 B1 | 5/2003 | Nichols et al. | |
| 6,607,123 B1 | 8/2003 | Jollifee et al. | |
| 6,620,057 B1 | 9/2003 | Pirritano et al. | |
| 6,705,942 B1 | 3/2004 | Crook et al. | |
| 6,974,391 B2 * | 12/2005 | Ainsworth | A63B 24/0006 473/153 |
| 6,998,965 B1 * | 2/2006 | Luciano, Jr. | A63B 24/0021 235/375 |
| 7,040,998 B2 | 5/2006 | Jollifee et al. | |
| 7,052,391 B1 | 5/2006 | Luciano, Jr. | |
| 7,056,221 B2 | 6/2006 | Thirkettle et al. | |
| 7,059,974 B1 | 6/2006 | Golliffee et al. | |
| 7,118,105 B2 | 10/2006 | Benevento | |
| 7,160,196 B2 | 1/2007 | Thirkettle et al. | |
| 7,315,253 B1 | 1/2008 | Pijanowski et al. | |
| 7,337,965 B2 | 3/2008 | Thirkettle et al. | |
| 7,540,428 B2 | 6/2009 | Baba et al. | |
| 7,691,009 B2 | 4/2010 | Savarese et al. | |
| 7,714,965 B2 | 5/2010 | Chien et al. | |
| 7,766,766 B2 | 8/2010 | Savarese et al. | |
| 7,791,982 B2 | 9/2010 | Karr | |
| 7,843,334 B2 | 11/2010 | Kumagai et al. | |
| 8,120,540 B1 | 2/2012 | Armstrong | |
| 8,866,613 B2 | 10/2014 | Luciano, Jr. | |
| 8,882,606 B2 | 11/2014 | Leech et al. | |
| 2002/0065567 A1 | 5/2002 | Kodera | |
| 2003/0004005 A1 | 1/2003 | Ainsworth et al. | |
| 2003/0085619 A1 | 5/2003 | Strache et al. | |
| 2003/0191547 A1 | 10/2003 | Morse | |
| 2004/0142766 A1 | 7/2004 | Savarese et al. | |
| 2004/0214648 A1 | 10/2004 | Simpson | |
| 2004/0243262 A1 | 12/2004 | Hoffmann | |
| 2005/0051951 A1 * | 3/2005 | Benevento | A63B 67/02 273/120 R |
| 2005/0070376 A1 | 3/2005 | Savarese et al. | |
| 2005/0227792 A1 | 10/2005 | McCreary et al. | |
| 2005/0272496 A1 * | 12/2005 | Reinish | A63B 63/00 463/2 |
| 2005/0282650 A1 | 12/2005 | Miettinen et al. | |
| 2006/0105857 A1 | 5/2006 | Stark | |
| 2006/0122007 A1 | 6/2006 | Savarese et al. | |
| 2007/0026968 A1 | 2/2007 | Ratcliffe | |
| 2007/0026986 A1 | 2/2007 | Walker | |
| 2007/0167247 A1 | 7/2007 | Lindsay | |
| 2007/0259740 A1 | 11/2007 | Savarese et al. | |
| 2008/0000364 A1 | 1/2008 | Bevirt | |
| 2008/0021651 A1 * | 1/2008 | Seeley | A63B 24/0021 702/3 |
| 2008/0158072 A1 | 7/2008 | Logan et al. | |
| 2008/0207357 A1 | 8/2008 | Savarese et al. | |
| 2009/0017944 A1 | 1/2009 | Savarese et al. | |
| 2009/0052618 A1 | 2/2009 | Homanfar et al. | |
| 2009/0253526 A1 | 10/2009 | Koudele et al. | |
| 2009/0314423 A1 | 12/2009 | Savarese et al. | |
| 2010/0201512 A1 | 8/2010 | Stirling et al. | |
| 2010/0304876 A1 * | 12/2010 | Hohla | A63B 24/0003 473/199 |
| 2010/0328038 A1 | 12/2010 | Kato | |
| 2011/0201437 A1 | 8/2011 | Fallow et al. | |
| 2012/0052967 A1 | 3/2012 | Grieshaber et al. | |
| 2012/0096358 A1 | 4/2012 | Barnes, Jr. | |
| 2012/0205452 A1 | 8/2012 | Rofougaran | |
| 2012/0208464 A1 | 8/2012 | Rofougaran | |
| 2012/0208638 A1 | 8/2012 | Barney et al. | |
| 2012/0255998 A1 | 10/2012 | Luciano et al. | |
| 2012/0255999 A1 | 10/2012 | Luciano, Jr. et al. | |
| 2012/0256731 A1 | 10/2012 | Luciano et al. | |
| 2013/0023210 A1 | 1/2013 | Rofougaran | |
| 2013/0154176 A1 | 6/2013 | Oshima | |
| 2013/0165261 A1 | 6/2013 | Luciano et al. | |
| 2013/0196787 A1 | 8/2013 | Luciano et al. | |
| 2013/0196788 A1 | 8/2013 | Shimizu et al. | |

\* cited by examiner

RADAR BASED TRACKING SYSTEM FOR GOLF DRIVING RANGE

CROSS REFERENCE

This patent application claims the benefit of provisional patent application 61/766,646 filed on Feb. 19, 2013 and entitled RADAR BASED TRACKING SYSTEM FOR GOLF DRIVING RANGE; and this application is a continuation-in-part of utility patent application Ser. No. 13/212,850 filed on Aug. 18, 2011 entitled BALL SEPARATION DEVICE FOR A GOLF RANGE TARGET, which claims benefit of provisional patent application 61/375,555 filed on Aug. 20, 2010 and entitled BALL SEPARATION DEVICE FOR A GOLF RANGE TARGET; and this application is a continuation-in-part of utility patent application Ser. No. 13/212,885 filed on Aug. 18, 2011 entitled MOVABLE GOLF RANGE TARGET WITH RFID BALL IDENTIFIER, which claims the benefit of provisional patent application 61/374,713 filed on Aug. 18, 2010 entitled MOVABLE GOLF RANGE TARGET WITH RFID BALL IDENTIFIER; and this application is a continuation-in-part of utility patent application Ser. No. 13/277,940 filed on Oct. 20, 2011 entitled RFID GOLF BALL TARGET SYSTEM AND METHOD; and this application is a continuation-in-part of utility patent application Ser. No. 13/444,652 filed on Apr. 11, 2012 entitled GOLF BALL WITH RFID INLAY IN A MOLDED IMPRESSION; and this application is a continuation-in-part of utility patent application Ser. No. 13/444,660 filed on Apr. 11, 2012 entitled GOLF BALL WITH RFID INLAY BETWEEN A SPLIT CORE; and this application is a continuation-in-part of utility patent application Ser. No. 13/444,679 filed on Apr. 11, 2012 entitled GOLF BALL WITH ENCAPSULATED RFID CHIP; and this application is a continuation-in-part of utility patent application Ser. No. 13/655,853 filed on Oct. 19, 2012 entitled RFID EMBEDDED WITHIN INNER CORE OF A MULTI-CORE GOLF BALL; and this application is a continuation-in-part of utility patent application Ser. No. 13/655,882 filed on Oct. 19, 2012 entitled SPLIT CORE OF A MULTI-CORE GOLF BALL WITH RFID; all of which are incorporated by reference.

BACKGROUND

A golf driving range lets golfers practice their golf swing. Generally, a golf driving range is adjacent to a golf course and a player purchases a bucket of golf balls and attempt to hit targets in the golf driving range. The balls may be stored in buckets or dispensed into a bucket from a hopper. The player takes the balls to the tee area. The golf driving range has various markers for distance placed throughout the range. A player hits the ball and makes a visual estimate of the distance the ball traveled based on the landing location of the ball relative to the distance markers. Players would benefit from a system capable of accurately determining the distance of ball travel.

RFID transponders embedded in golf balls have been used to allow a player to detect the distance of travel of a golf ball. For example, a player may use a handheld reader to detect the location of a golf ball after it is hit. However, some players may not wish to be burdened with a handheld reader during play.

Although golf balls having RFID transponders have been used in conjunction with ball collectors capable of reading the transponders to determine the distance traveled by a golf ball, it would be beneficial to provide a movable target which can be repositioned to provide flexibility in the arrangement of a golf range, in which the movable target includes a nested funnel configuration.

Additionally, driving ranges that employ RFID chip technology are limited because they do not support game selection modules that include games of chance or the combinations of games of skill and games of chance.

SUMMARY

A golf ball range target system that includes a golf target, a golf ball dispenser, at least one golf ball, a tracking module, and a client computer is described. The golf target has a known geographic location and includes at least one golf target area. The golf ball dispenser houses a plurality of golf balls. The golf ball is associated with a particular player. The tracking module determines a golf ball flight trajectory for the golf ball associated with the particular player. The golf ball flight trajectory includes a golf ball landing area. The tracking module is configured to measure a ball roll for the golf ball. The ball roll is measured from the golf ball landing area to a roll stop area. The client computer presents the golf ball trajectory, the ball roll, and the golf target on a display.

In the illustrative embodiment, the client computer includes a touch screen display. Additionally, the golf ball target system may also include a plurality of golf driving range booths that each includes a mat, in which the golf ball is dispensed on to the mat. Also, each of the golf driving range booths includes a tracking module and the client computer configured to present a plurality of player information associated with the particular player. The golf ball range target system may also include a server communicatively coupled to the tracking module and the client computer. The server includes a database that stores at least one of a club speed, a ball speed, a ball travel distance, the golf ball trajectory, the ball roll, and the geographic location of the target.

The golf ball range target system may also include a game selection module presented on the client computer, in which the game selection module enables the player to select from a plurality of different games. Furthermore, the game selection module may also include at least one game of skill, in which an award is provided when the golf ball associated with the player lands in the golf target. Further still, the game selection module may include at least one game of chance that further comprises a game session for the game of chance that is initiated when the golf ball is struck by the player, a random result for the game session, and a prize that is awarded according to the random game session result.

A golf ball range target system that includes a golf target, a golf ball dispenser, a golf ball, a plurality of golf driving range booths, a plurality of tracking modules, a reader, and plurality of client computers, and a server is also described. The golf target has a known geographic location that includes at least one golf target area. The golf ball dispenser houses a plurality of golf balls. The illustrative golf ball is associated with a particular player. The golf driving range booths each include a mat and the golf ball is dispensed on the mat. One tracking module is associated with each booth. The tracking module tracks each golf ball dispensed on the mat. The tracking module tracks a golf club speed, a ball speed, and a ball travel distance. The reader reads at least one of a near-field communications (NFC) chip, a radio-frequency identification chip, a mag stripe card, and a wireless device. Each drive bay also includes a client computer that presents a plurality of player information associated with the particular player in the golf driving range booth. Additionally, each client computer displays at least one of the golf club speed, the ball speed, and the ball travel distance. The server is communicatively coupled to each tracking module and each client computer. The server includes a database that stores at least one of the golf club speed, the ball speed, and the ball travel distance for each player.

FIGURES

The illustrative embodiment will be more fully understood by reference to the following drawings which are for illustrative, not limiting, purposes.

DETAILED DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the golf range system and method described hereinafter may vary as to configuration and as to details.

Figure 1A:
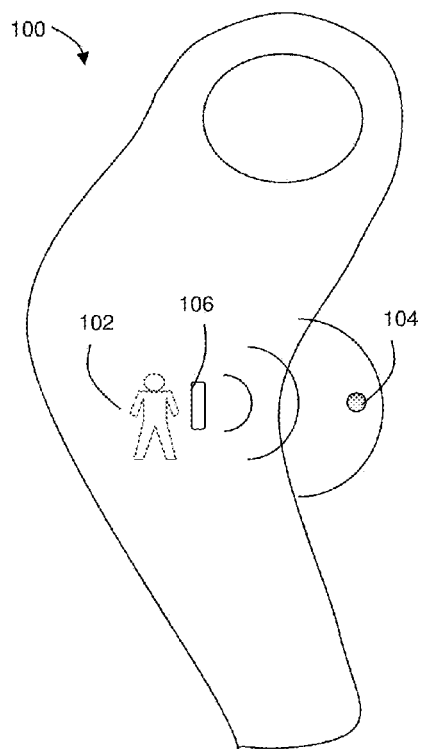
FIGS. 1A and 1B shows a prior art system for determining the distance of travel for a golf ball with RFID golf ball.
Figure 1B:
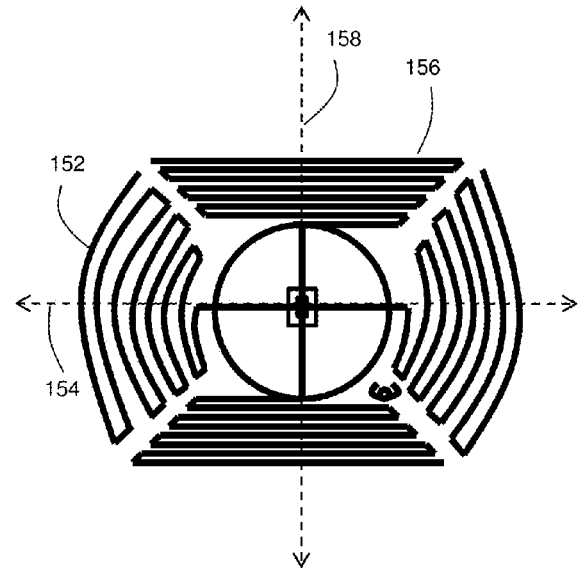

Referring now to FIGS. 1A and 1B, there is shown a prior art system 100 for determining the distance of travel for a golf ball with RFID golf ball. A player 102 hits a golf ball having embedded RFID tag 104. The player then uses a handheld RFID reader 106 to detect the golf ball. The handheld reader calculates the distance between the handheld reader and the golf ball. The RFID tag includes a first antenna 152 oriented along a first axis 154 and a second antenna 156 oriented along a second axis 158 that is perpendicular to the first axis. The perpendicular arrangement of the antennae 152 and 156 allows the RFID transponder to be sensitive along the plane defined by the first axis and the second axis.

Figure 2:
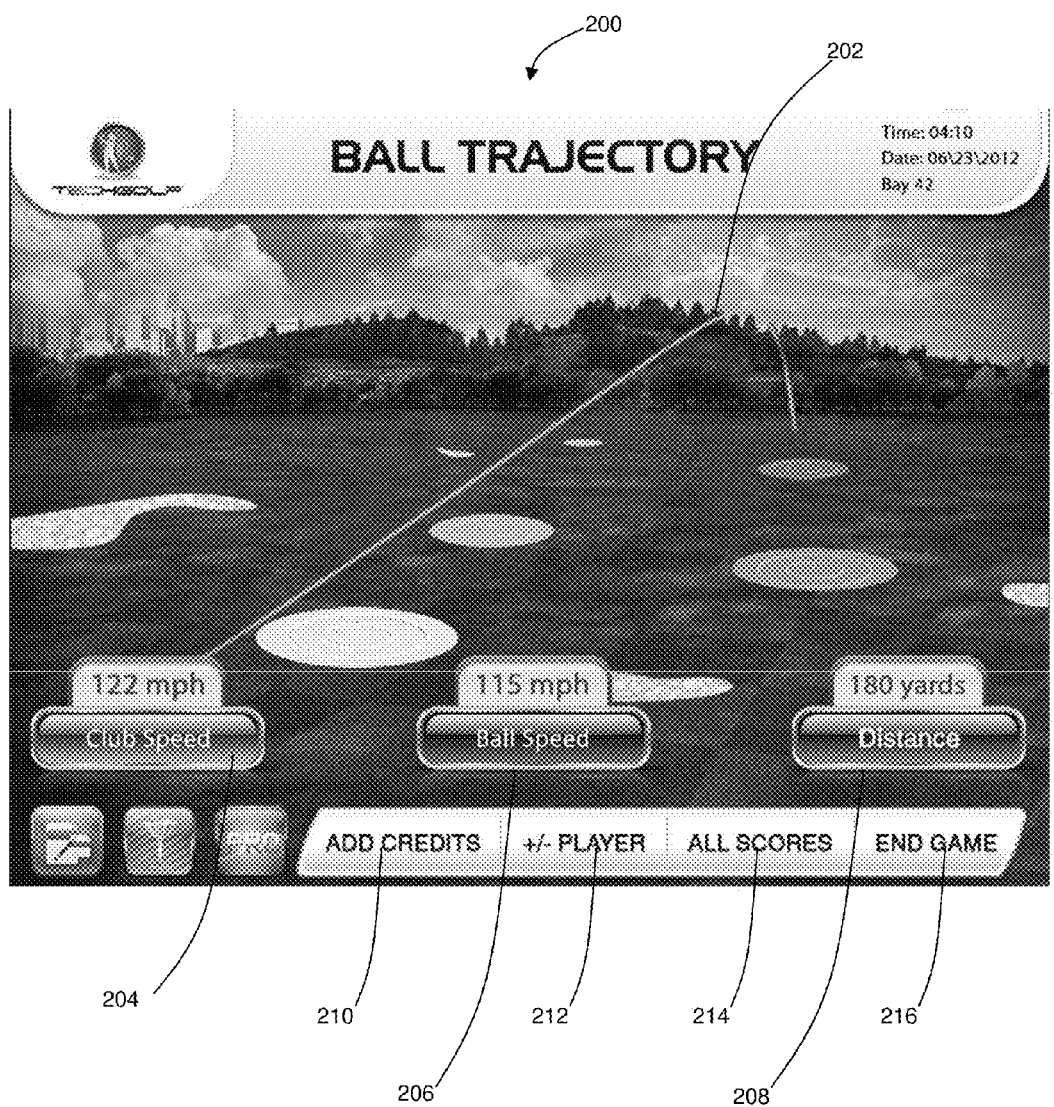
FIG. 2 shows a screenshot of the ball trajectory after a golf ball is struck by a player.

Referring to FIG. 2 there is shown a screenshot of the ball trajectory after a golf ball is struck by a player. The illustrative screenshot 200 presents a golf ball trajectory 202 using a tracking module such as a 3D Doppler radar sensor, as described in further detail below. When the player strikes the golf ball, the tracking module tracks the golf ball and displays its flight path on the screen, as shown in FIG. 2. By way of example and not of limitation, each bay or "booth" in a driving range may include a tracking module. Additionally, in the illustrative embodiment, the tracking module is configured to measure club speed 204, ball speed 206, and distance 208.

The screenshot 200 also presents additional tabs or information such as an add credits tab 210, an add/remove player tab 212, a view all score tab 214, and an end game tab 216.

After the golf ball lands in the driving range, the system and method presented herein determine whether the player has landed in the target area. For example, if the golf ball lands in one of the multiple portable or stationary targets on the driving range, the player is awarded points based on the distance away from the pin. This target area is presented as a plurality of concentric circles surrounding the pin.

If the player lands in one of the hazards on the playing field, negative points may be awarded and displayed on the game user interface, and the total player points are decremented accordingly.

The screenshot 200 may be associated with a game of skill played by a group of players, in which each player has an opportunity to strike a golf ball, hit a target and be awarded points for having their golf ball land in a target area. Thus, after a first player's information is displayed, the first player's turn is finished and the next player can then attempt to have his golf ball land in one of the target areas 306, 308 or 310 (shown on FIG. 3).

Each player's game information may be stored in a web accessible website and database that allows each player to go to the website and view his past performance for the different games played.

Figure 3:
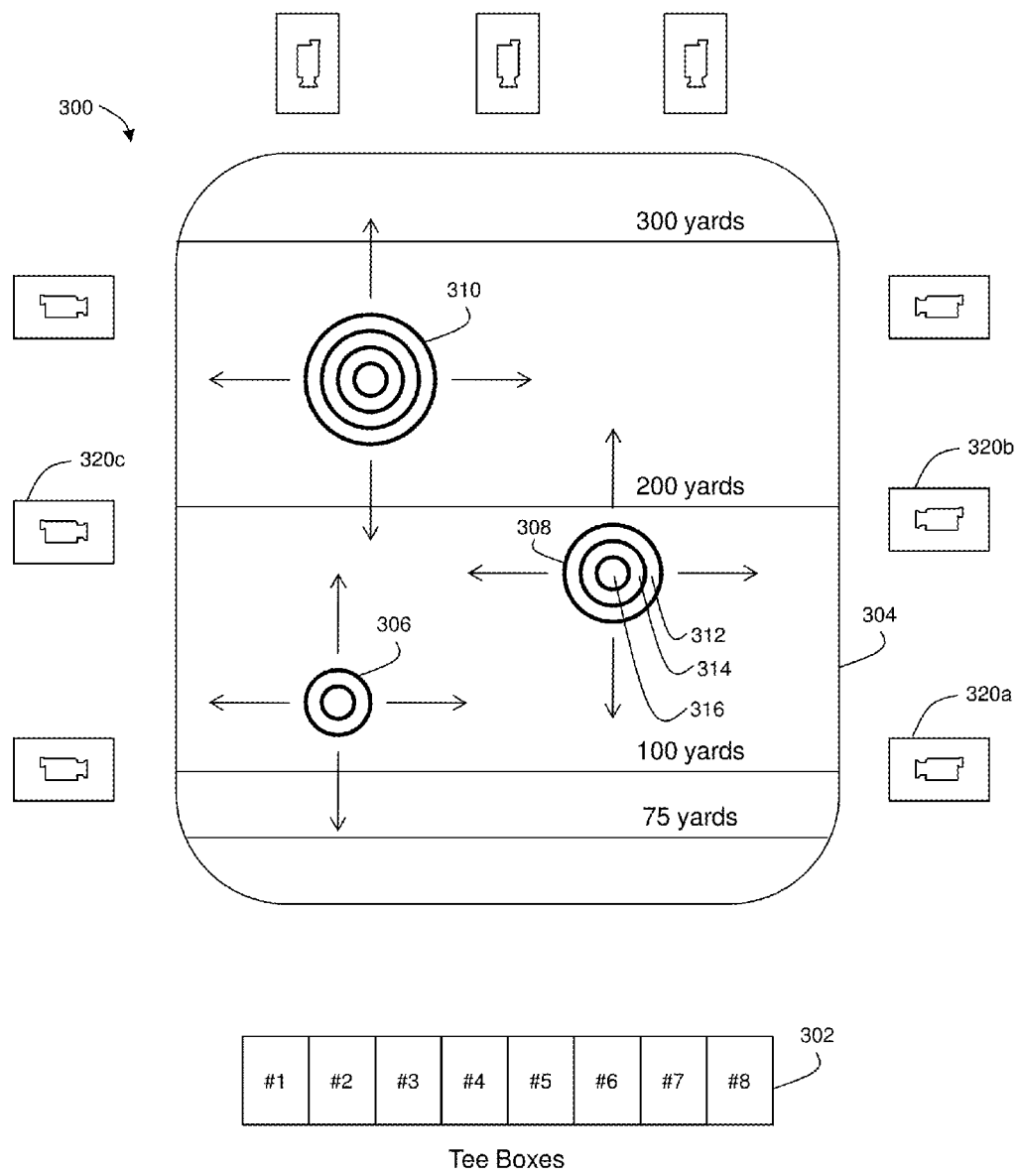
FIG. 3 shows an illustrative driving range having movable target areas and booths.

Referring to FIG. 3, there is shown an illustrative driving range 300 having movable target areas and booths 302, with booths numbered #1 through #8. In operation, one or more players enter the booth and strike a golf ball from the tee box and aims for one of the targets 306, 308 or 310.

In the illustrative embodiment, the targets 306, 308 and 310 are movable targets. The movable targets may be embodied as above-ground targets, on-ground targets, or a combination thereof. The arrows shown adjacent to the targets indicate that the targets are movable. A movable target may be relocated to any position on the target area 304, which is distinguishable from an in-ground target that cannot be relocated.

The determination of a target area may vary and would be dependent on the game, type of target, bets, side bets, or other such game parameters that affect the determination of a qualified "target." For example, a target may be an on-ground target that appears as evenly spaced concentric circles that surround a flag, i.e. the center of the target area.

Additionally, the determination of a target area may be dependent on the where the golf ball lands, how the golf ball rolls after it lands, and where the golf ball stops. Thus, there may be different target areas that would be dependent on the ball trajectory, ball roll, ball stop, or a combination thereof.

Further still, the determination of a target area is going to be dependent on the zones that make up the target area. Thus, a particular target may include a plurality of different target zones. In the illustrative embodiment, the target area and the target zones are symmetrical and are defined by concentric circles. Alternatively, the target area may be asymmetrical and the target zones may also be asymmetrical.

In another illustrative example, if the target is an above-ground target that has a plurality of funnels, in which the rims of the funnels appear as evenly spaced concentric circles surrounding a bullseye, then the target area is defined by the location of the ball landing within one of the funnels. The movable funnel target includes at least one enclosed boundary capture component having a top boundary edge, a bottom boundary edge, and a tapering surface material that joins the top boundary edge to the bottom boundary edge. By way of example and not of limitation, the tapering surface material may be composes of a plastic, UV resistant material. The shape of the enclosed boundary components can include curved sectors or segments that are connected to one another resulting in a variety of different sizes and shapes. Thus, the shape of the enclosed boundary capture component is determined by engineering and design constraints.

In the illustrative embodiments presented herein, the movable golf range target system may include an issuing golf ball reader 802, a tee area reader 808, a booth sensor 810 and a target sensor 812, as described in further detail below in FIG. 8. Additionally, a plurality of target sensors 320 monitor the target area 304 and determine whether the golf ball has "hit" one of the targets 306, 308, of 310.

During an illustrative "top gross" game session, each player may be aiming for target 308 and each player is awarded the same point value for landing in outer zone 312, in which the perimeter 312 is defined by two concentric circles, as shown in FIG. 3. A higher point value is awarded for landing the ball within inner zone 314 to each of the players in the group. The highest point value for target 308 is awarded to each player when a golf ball lands in the innermost zone 316 that surround a flag (not shown).

During an illustrative "top net" game session, the point values for landing in zones 312, 314, and 316 may vary depending on the skill of each player. Thus, a player with a lower handicap may be awarded less points for landing in the same target area as a player with a higher handicap.

For purposes of this patent, the term "game session" includes a plurality of game events. By way of example and not of limitation, a game event corresponds to a player hitting a golf ball and a game session occurs after a predetermined number of game events.

Additionally, the term "game session" may apply to a plurality of different games being played at the same time by the group of players. For example, the players may decide to play a game of "skins" and simultaneously keep track of their gross scores and net scores. As such three different games would be played during the same game session. However, each game is subject to a different set of rules or conditions and so each game would have its own set game events that are consistent with the particular rules corresponding to the particular game.

Figure 4A:
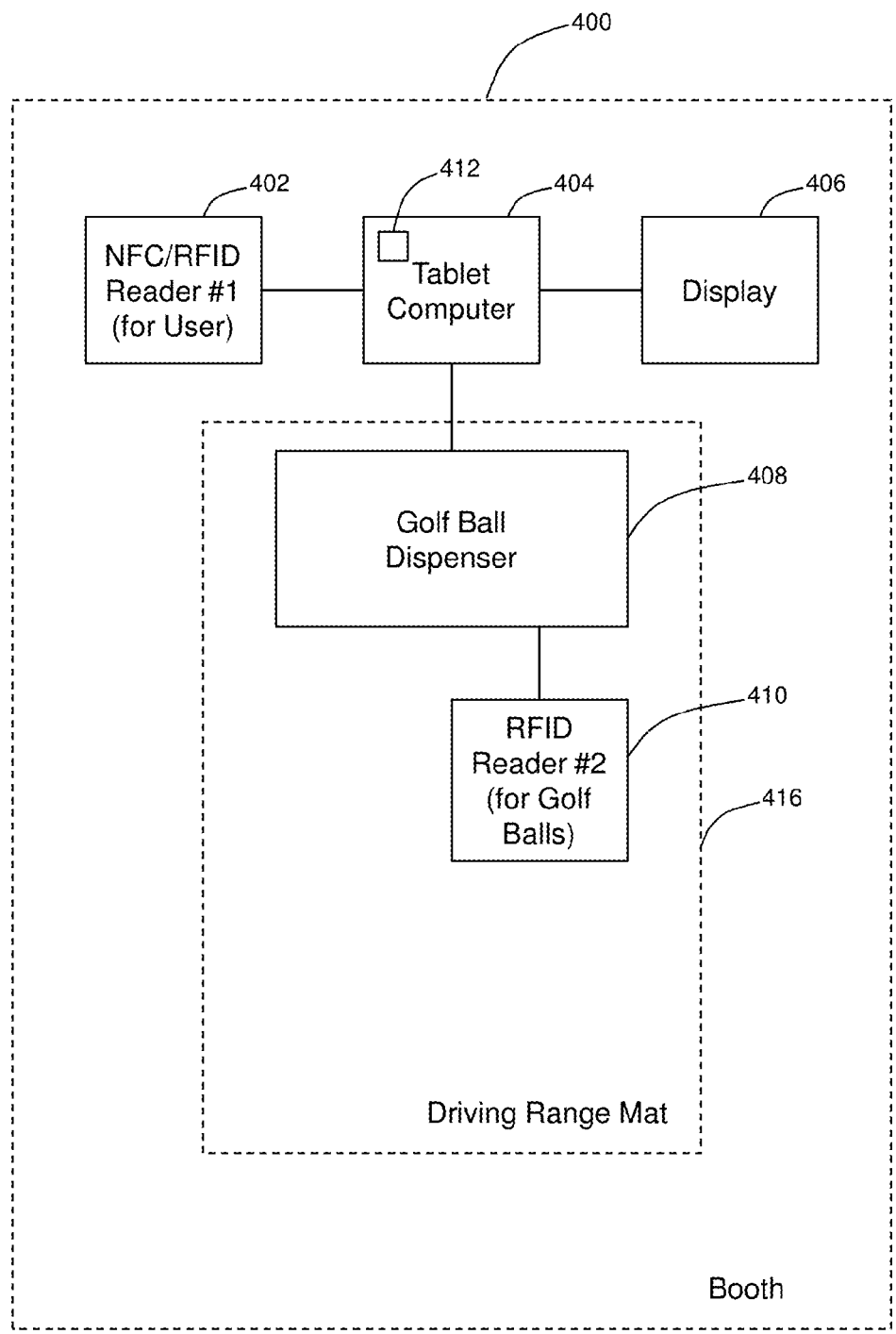
FIG. 4A shows the system of components of an illustrative booth that uses RFID golf balls.

Referring to FIG. 4A, there is shown the system of components of an illustrative booth that relies on RFID golf balls. The illustrative booth 400 includes a scanner 402, a client computer 404, a display 406, a golf dispenser 408, and a tee area reader 410. The illustrative scanner 402 is a Near Field Communications (NFC) reader or an RFID reader for a membership card with an RFID tag. The illustrative scanner reads an electronic device (not shown) that is associated with the particular player. The illustrative electronic device may be a wireless handset or RFID card associated with the particular player.

After the scanner 402 reads the player's electronic device, an identification (ID) number associated with the player's electronic device is activated in a centralized database (not shown) and the illustrative tablet computer 404 and display 406 presents the player information. The illustrative client computer 404 is a tablet computer such as an iPad® manufactured by Apple Inc. The display is a much larger and presents the player information to other players in proximity of the booth 400.

In operation, a player enters the golf driving range booth 400. On an illustrative client computer 404 such as an iPad® tablet computer mounted to an support column (not shown) on one side of the booth, the player scans his or her electronic device such as a Near Field Communications (NFC) device or a membership card with a RFID tag is read by the scanner 402. The electronic device identifies the particular player. More players can join the game at the booth or via a gaming server from different booths or site locations, thereby allowing for other players from other locations to play against one another.

After the player selects a game using tablet computer 404, an RFID golf ball is dispensed from golf ball dispenser 408. In the illustrative embodiment, a golf ball with a UHF omni-directional RFID chip is dispensed on to a driving range mat 416 by golf ball dispenser 408.

When the golf ball dispenser 408 dispenses the RFID golf ball, the RFID reader 410 with an RFID near field read (NFR) antenna reads the RFID golf ball. The RFID reader 410 is communicatively coupled to a network having a server that receives the RFID golf ball information. More particularly, the unique ID from the RFID tag in the RFID golf ball is read and inserted into a database table that contains the logged-in user's ID. After the golf ball rolls onto the driving range mat 416, the golf ball is struck by the player.

The illustrative client computer 404 includes a touch screen display that allows a player to interact with a game selection module 412. The game selection module 412 includes at least one game of skill, in which an award is provided when the RFID golf ball associated with the player ID is read by the target RFID reader that is associated with the capture area. By way of example and not of limitation, the award may be a predetermined number of points based on the distance and size of the capture area.

In an alternative embodiment, the game selection modules 412 includes at least one game of chance, in which a game session for the game of chance is initiated when the RFID golf ball associated with the player ID is read by the target RFID reader, a random result for the game session is generated, and a paytable associates a prize with the random game session result. The awarded prize is then displayed to the player.

In another embodiment, the game selection module 412 includes a game that has both a first game of skill component and a second game of chance. The embodiment starts with the player, by way of example and not of limitation, hitting the ball in the target area and getting points, and a subsequent game of chance, i.e. spinning a wheel for additional points. In operation, a first award is initially provided when the RFID golf ball is received by the capture area. This first award is based on the player's skill in hitting the ball at the appropriate target. The player then has the opportunity to play a second game of chance. By way of example and not of limitation, the second game may be referred to as a bonus game, in which the bonus game is a game of chance, where the player gets to spin a wheel. The random prize corresponding to the spinning wheel is then awarded to the player. Alternative games of chance include reels in a slot machine, virtual scratcher, bingo card, lottery game or other such graphic representation of a game of chance.

In another game embodiment, after a predetermined number of misses by the player, e.g. after 20 balls have been struck but none landed in the target area, the game session for the game of chance is initiated. Therefore, the player can continue to play the game and win points, even if he or she lacks the skill necessary to strike the golf ball and hit the target.

A plurality of different RFID golf balls are described in patent application Ser. No. 13/444,652 filed on Apr. 11, 2012 entitled GOLF BALL WITH RFID INLAY IN A MOLDED IMPRESSION; Ser. No. 13/444,660 filed on Apr. 11, 2012 entitled GOLF BALL WITH RFID INLAY BETWEEN A SPLIT CORE; Ser. No. 13/444,679 filed on Apr. 11, 2012 entitled GOLF BALL WITH ENCAPSULATED RFID CHIP; Ser. No. 13/655,853 filed on Oct. 19, 2012 entitled RFID EMBEDDED WITHIN INNER CORE OF A MULTI-CORE GOLF BALL; Ser. No. 13/655,882 filed on Oct. 19, 2012 entitled SPLIT CORE OF A MULTI-CORE GOLF BALL WITH RFID, which are hereby incorporated by reference.

Figure 4B:
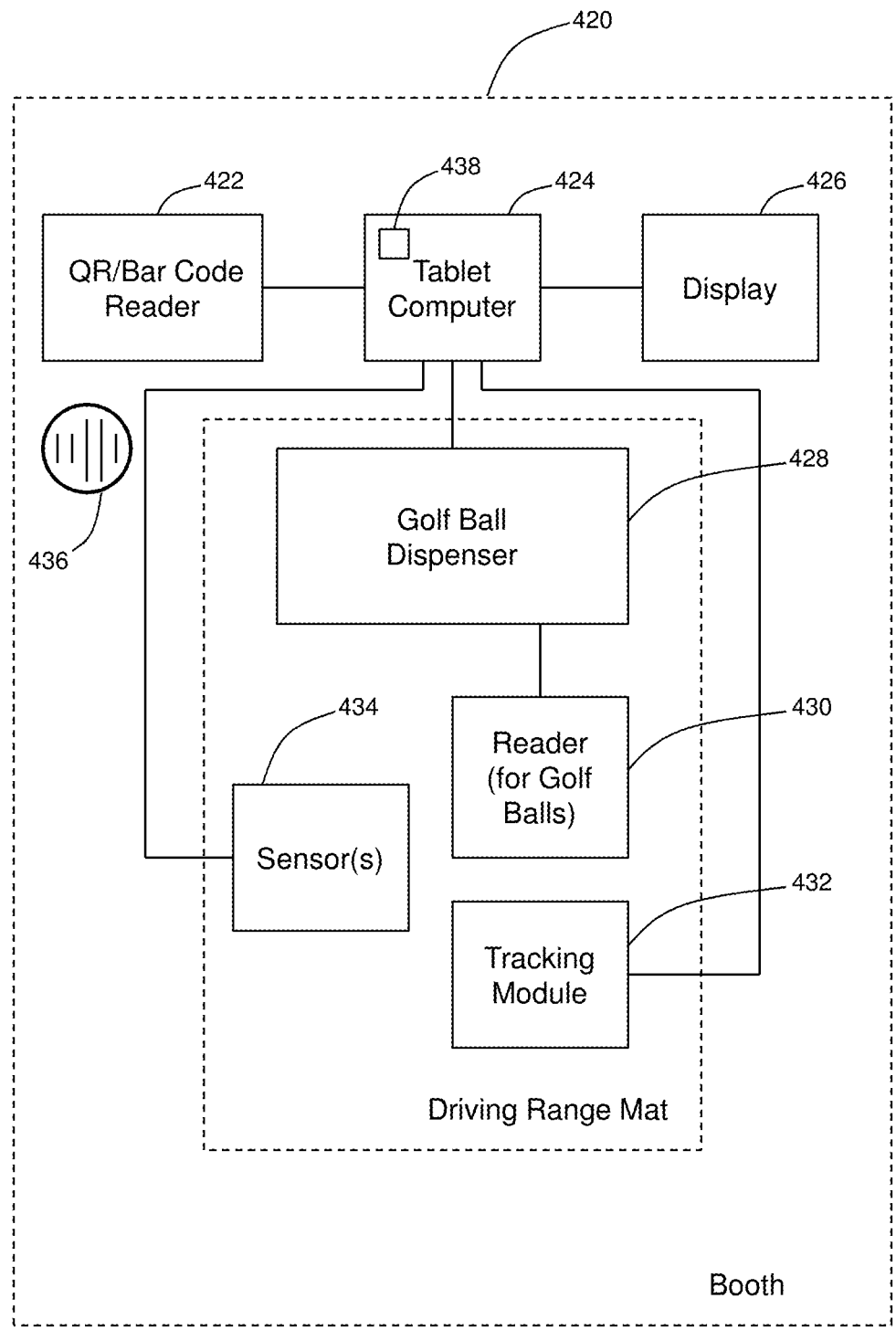
FIG. 4B shows the system of components of an illustrative booth that uses on a tracking module to track golf balls.

Referring to FIG. 4B, there is shown the system of components of an illustrative booth 420 that relies on a tracking module to track golf balls. This illustrative embodiment may operate without RFID golf balls. In this illustrative embodiment, the golf ball 436 includes a bar code that is read by issuing reader 422. The issuing QR/bar code reader 422 is communicatively coupled to a tablet computer 424, which is also communicatively coupled to display 426. At least one sensor 434 is also communicatively coupled to the tablet computer 424. The tablet computer 424 also includes a touch screen display 438 that allows a player to interact with a game selection module 434.

The illustrative booth 420 also includes a golf ball dispenser 428 that is communicatively coupled to a golf ball reader 430 and a tracking module 432.

In the illustrative embodiment, a golf ball 436 is dispensed from the golf dispenser 428. The illustrative reader 422 may be configured to be the issuing golf ball reader described in FIG. 8. Alternatively, the reader 430 may be configured to operate as the issuing golf ball reader described in FIG. 8.

In another embodiment, the illustrative reader 422 does not read any bar code, QR code, or RFID tag associated with the particular golf ball. Instead the readers generate a time stamp of when the golf ball is dispensed and communicate the timestamp and unique identifier for one or more readers to server 804 (see FIG. 8). The timestamp may then be combined with reader's unique identifier to generate a golf ball unique identifier that is stored on the server 804. By way of example and not of limitation, the unique reader ID may be obtained from the media access control address (MAC address), which is commonly stored in the hardware of the reader.

The tracking module 432 is configured to track a single ball through a group of golf balls. The illustrative tracking module 432 may employ a phase array Doppler with predictive and stochastic algorithms. Preferably, the tracking module 432 operates using line of sight but may also operate without line of sight and rely on algorithms.

By way of example and not of limitation, the tracking module 432 generates an XML stream and has an API that can connect via Wi-Fi and send the XML stream to a server that is part of a back-end system. The tracking module 432 may operate as a Wi-Fi hotspot or in an ad hoc manner. An illustrative GUI of the data generated by the tracking module is presented in FIG. 2.

A tracking module may be obtained from a company such as FLIGHTSCOPE® that tracks golf balls up to 250 yards with 6 inch or less accuracy. The illustrative tracking module 432 may operate independent of the RFID reader presented in FIG. 4A or may be used in conjunction with RFID reader presented in FIG. 4A.

Additionally, other sensors 434 may also disposed in the booth 420, such as a camera sensor. The camera sensor 434 may be used to monitor the player's swing when he hits the ball, and the display 426 may present the output from the illustrative sensor 434.

Figure 5A:
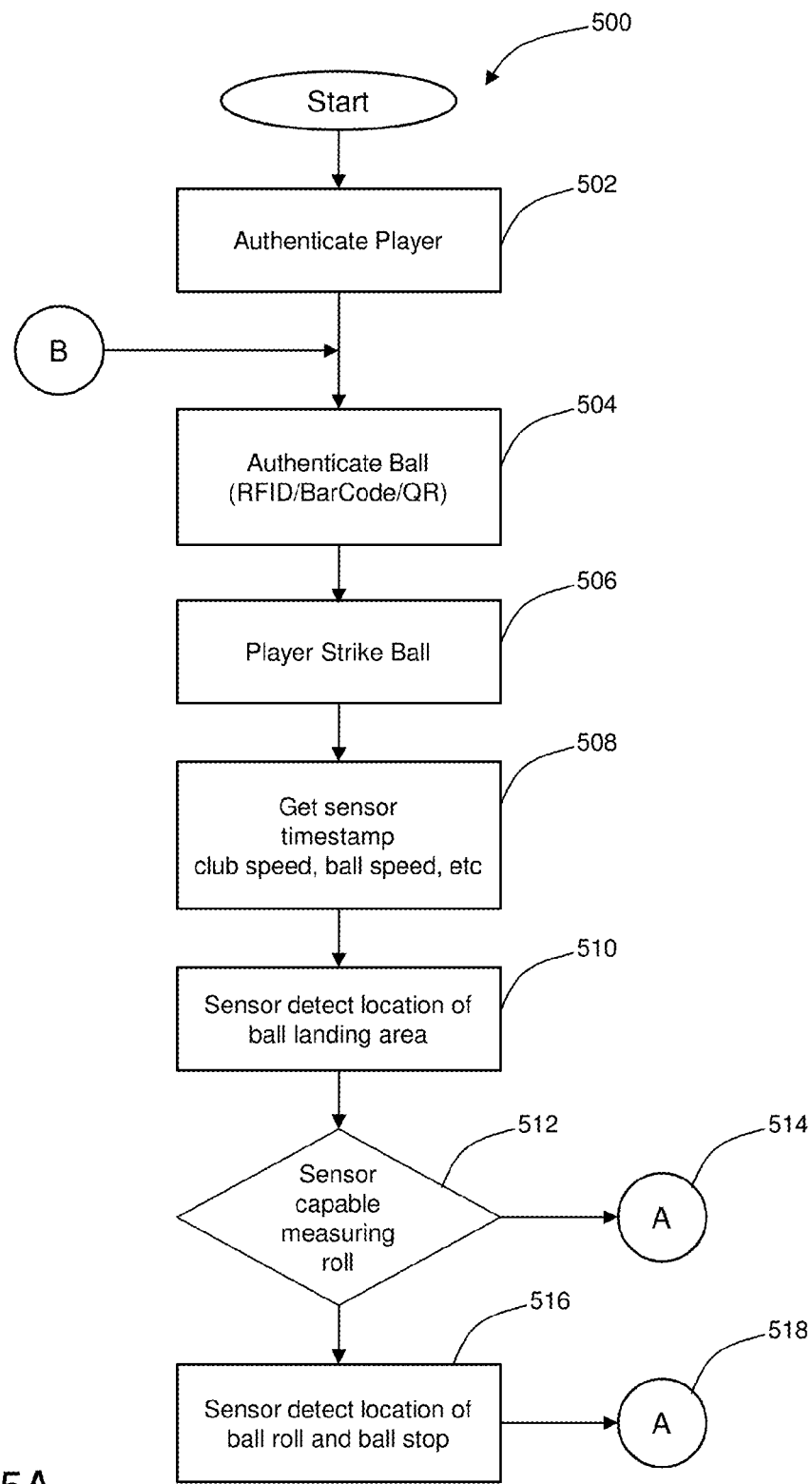
FIGS. 5A and 5B show an illustrative method for operating the illustrate golf ball range target system.

In FIG. 5A, there is shown a first portion of an illustrative method 500 for operating the illustrative golf ball range target system described herein. The method is initiated at block 502 where a player is authenticated. The player authentication process may include having the player scan an electronic device with a unique ID in a particular booth. Thus, the player is associated with the booth for a period of time, which is also referred to as a game session. A game session includes game play corresponding to one or more games. Player information may be accessed using the unique ID. After being authenticated, the player may then proceeds to select a game to play.

At block 504, a golf ball is authenticated. The golf ball authentication process associates a dispensed golf ball with the particular play in the particular booth. The golf ball authentication process includes identifying the golf ball. By way of example and not of limitation, the dispensed golf ball may be identified using a bar code, a quick response code (QR code), a RFID tag, or other such technologies that may be used to identify a particular golf ball. An illustrative reader as described above may be disposed in the booth to scan or read the identification means corresponding to the particular golf ball.

At block 506, the player places the golf ball on a mat or tee, prepares to approach the golf ball, establishes their stance, begins their golf swing, strikes the golf ball and then follows through. Depending on the type of booth, another golf ball may be dispensed on to the golf mat or tee so the player does not have to bend over and pick up a golf ball from the bucket of balls. As described above, one or more sensors may be deployed to monitor the flight path of the golf ball, the path of player's golf swing, and the player's form.

At block 508, the data capture from the sensor or sensors is obtained. By way of example and not of limitation, the sensor is a tracking module 432, as described above in FIG. 4B, that relies on a Doppler radar tracking system. The illustrative sensor is configured to obtain a timestamp of when the player struck the golf, the club speed, the ball speed, and the distance travelled by the golf ball, as shown in FIG. 2. Additionally, the sensor may also include video of the player swinging and the player striking the golf ball. The sensor may also determine that the golf ball has left the golf booth and provide a corresponding timestamp. Furthermore, there may also be other sensors, e.g. cameras 320, outside the illustrative booth 420 that can also track the ball speed and distance travelled by the golf ball struck in a particular booth, as shown in FIG. 3.

At block 510, a sensor detects the location of the ball landing area. By way of example and not of limitation, a target having a sensor is configured to read an RFID golf ball when the RFID enters the target, as described in the patent application entitled RFID GOLF BALL TARGET SYSTEM AND METHOD filed on Oct. 20, 2011, which is hereby incorporated by reference.

Figure 5B:
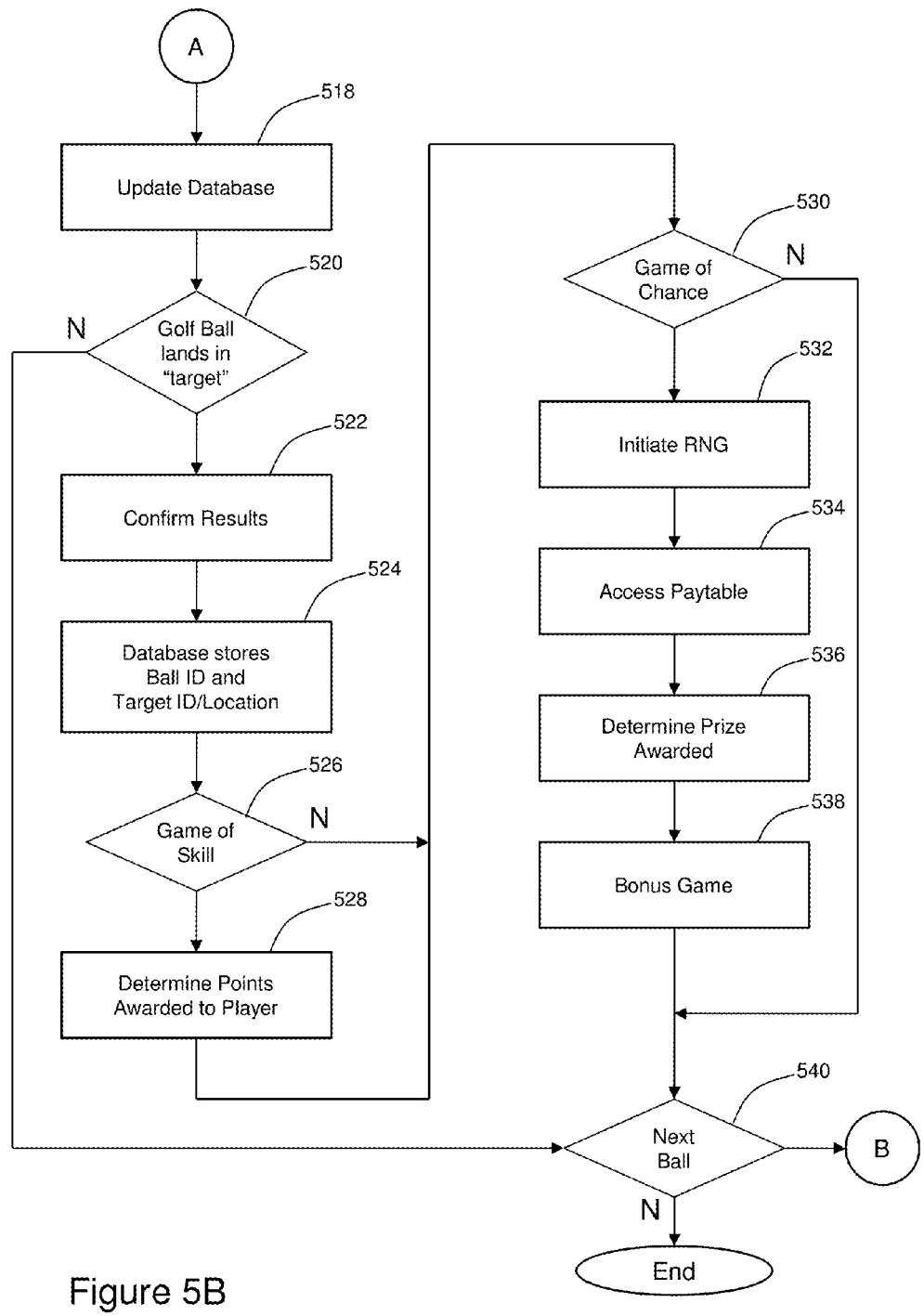

The method then proceeds to decision diamond 512, where a determination of whether the sensor can measure a rolling ball is performed. In certain embodiment the golf target includes cavities that receive golf balls, so golf balls are not able to roll as they would if they just contacted the ground. For embodiments that do not require measuring the ball roll, the method then proceeds to block 518 in FIG. 5B where the illustrative database is updated to reflect that the illustrative RFID ball "hit" or "miss" the target.

If one of the sensors is capable of measuring ball roll at decision diamond 512, the method proceeds to block 516, where the sensor detects the ball roll trajectory, ball hops, and ball stop. In block 518, the measured ball roll data is then communicated to the database 806 (shown in FIG. 8).

At decision diamond 520, the determination is made if the golf ball has landed in a target. The determination of landing in a target can vary and would be depend on the game, type of target, bets, side bets, or other such game parameters that affect the determination of a qualified "target." For example, if the target is an on-ground target that appears as evenly spaced concentric circles that surround a bullseye, e.g. an archery target, the target area may be defined by the location where the golf ball stops and the location of a ball landing. In another illustrative example, if the target is an above-ground target that has a plurality of funnels in which the rims of the funnels appear as evenly spaced concentric circles surrounding a bullseye, then the target area is defined by the location of the ball landing within one of the funnels—much like a game of skeeball.

If the golf ball does not land in the target, the method proceeds to decision diamond 540 where the player can decide to end the game or continue to the next ball and returns to block 504, where the next golf ball is selected and authenticated as described above. By way of example and not of limitation, if the player does not land on the target, zero (0) points are awarded for missing the target.

If the golf ball does land in the target area, the method proceeds to block 522 where the results may be confirmed by combining multiple sensors inputs. By way of example and not of limitation, a plurality of camera sensors that operate at high frame rates may be used to monitor an on-ground target area. Additionally, a tracking sensor such as a 3D Doppler radar tracking module located in the booth is time synchronized with the camera sensors. The illustrative combination of the tracking module (located at the booth) and the camera sensor(s) (located near the target area) determine the location of the golf ball by combining the output from both sensors. In the illustrative embodiment, at least two cameras surround the target to enable a 3D analysis of the camera images.

At block 522, the inputs from at least two sensors are combined and integrated with the other data and time synchronized with information about the player, the booth, and the golf ball. A variety of different data may be obtained from the booth and communicated to the illustrative database server which can then time synchronize with other sensor inputs. For example, the booth may collect information such as unique player ID, player loyalty rewards card information, golf ball RFID tag, or other such unique ID for the golf ball. Additionally, the booth may include tracking module information that is also communicated to the server. The server may also receive camera sensor input associated with the target. Thus, the information from the booth and the target area can be combined at the server and can be viewed contemporaneously and reviewed at later date for regulatory compliance purposes, which may be required for wagering games or games of chance.

In an alternative embodiment, an RFID golf ball is dispensed on to a mat that has an RFID reader capable of reading the RFID golf ball. The reader communicates the golf ball ID to the server. The player strikes the ball at an above ground target. The RFID reader is polling by repeatedly reading the RFID golf ball and when the ball is struck, the RFID reader records the time when RFID golf ball was not readable. Another illustrative sensor corresponding to the target then reads the RFID golf ball hitting the target and this information is communicated to the server. The illustrative target sensor may be a golf ball reader, e.g. RFID reader, or may be a camera sensor, or a combination thereof.

At block 524, the illustrative database server 804 stores the target sensor data, the booth sensor data, the golf ball ID data and the player data. The illustrative database server logs the data and may perform a variety of algorithms during the processing of the data logs. For example, if a particular golf ball enters a target area and is associated with a particular player, then the player's score may be updated with points corresponding to the target area. This updated point count is communicated to the database server, which then communicates these results to the client 424 or display 426 in the illustrative booth 420.

At decision diamond 526, a determination is made whether the player is playing a game of skill. If a game of skill has been initiated, an amount of points is awarded to a player at block 528. In the illustrative embodiment, points associated with a particular target, player ID and game session are associated with the appropriate database fields.

At decision diamond 530, a determination is made whether a game of chance has been initiated. In a first game of chance embodiment, when the golf ball lands in a target, a slot machine reel spins on the tablet client computer 424 and display 426 at the player's booth 420. The awarded points are then calculated in the database for that player and posted to the player's displays, on a website, and various displays throughout the facility (like a leader board).

In another game of chance embodiment, an illustrative random number generator is initiated is initiated at block 532. At block 534, the appropriate paytable is accessed for the particular game of chance. The prize that is awarded according to the paytable is determined at block 536. At block 538, an illustrative bonus game is initiated.

At decision diamond 540, a determination is made whether to play the next ball. The database of points for the active player is then displayed in a game format on the tablet and display at the booth, on a website, and various displays throughout the facility (like a leader board).

Wagering can and will be added in locations that allows for this. For example, the game of skins or Nassau can be played against other users in the same bay, against users in another bay, against users in other bays at other locations, or against a house pool of funds.

In another illustrative embodiment, a user purchases credits on their membership card to bet against the house. He chooses the amount he would like to bet before playing the game. The player then starts the game (i.e. skins). Every target that a player hits provides a spin on a slot machine reel. The closer to the center of the target and the farther the target is on the course, the better the payout odds become. For example, the front targets would have a 94% payout and the back targets a 97% payout. For example, if the player is unable to land within a target area within a predetermined number of attempts, e.g. nine attempts, then the player gets a free spin and after another predetermine number of attempts, e.g. 18 attempts, the player gets another free spin—if his score remains zero.

Figure 6A:
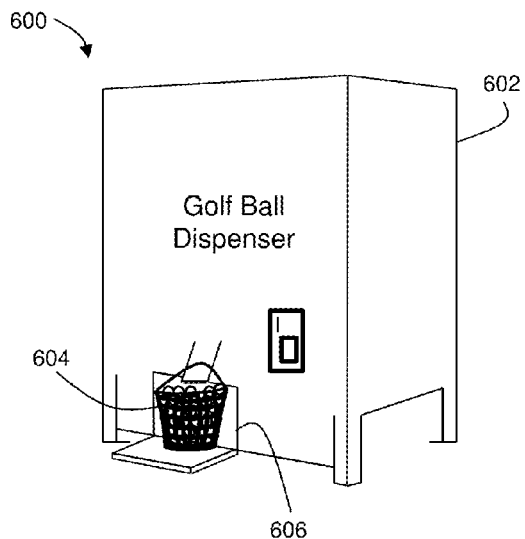
FIG. 6A shows a system for identifying multiple golf balls simultaneously at a golf ball dispenser.

Referring now to FIG. 6A, an illustrative system 600 for identifying multiple golf balls simultaneously at a golf ball dispenser is shown. The golf ball dispenser 602 is typically a hopper containing a large quantity of golf balls. The golf ball dispenser releases golf balls into an illustrative bucket 604 via a chute. The golf ball dispenser may have a money insertion slot and/or credit card reader or other transaction facilitating device to receive payment for the dispensed balls. The dispenser may release a fixed quantity of balls or may release different quantities depending on the amount of money paid to the dispenser. In some embodiments, balls are released incrementally in groups having a number equivalent to a maximum number of balls that may be simultaneously read by a reader such as an RFID reader, a bar code reader, a QR reader, or other such golf ball reader. By way of example and not of limitation, the golf ball dispenser may include a RFID reader 606 adjacent the illustrative bucket of balls. In an alternative embodiment, the golf dispenser 602 dispenses individual golf balls in the illustrative booth 400 described above.

Figure 6B:
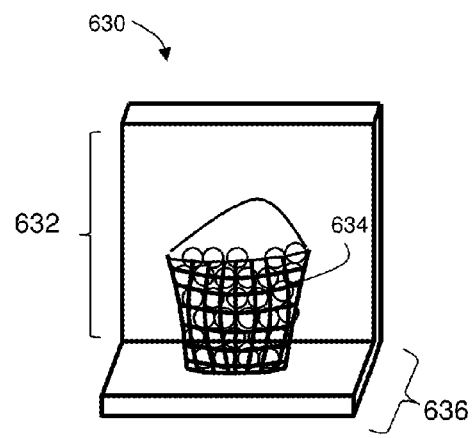
FIG. 6B shows a reader for simultaneously identifying each ball in a collection of golf balls is shown.

Referring now to FIG. 6B, an illustrative reader 630 for simultaneously identifying each ball in a collection of golf balls is shown. The illustrative RFID reader component may comprise antennae located in horizontal panel 632 located adjacent to ball bucket 634 and in platform 636 on which the bucket 634 rests. The reader component detects the unique ID associated with the golf ball. The reader is capable of detecting the ID of every golf ball located in the bucket. The RFID reader may operate using inductive coupling. In some embodiments, the RFID reader identifies the balls using backscatter coupling.

Figure 6C:
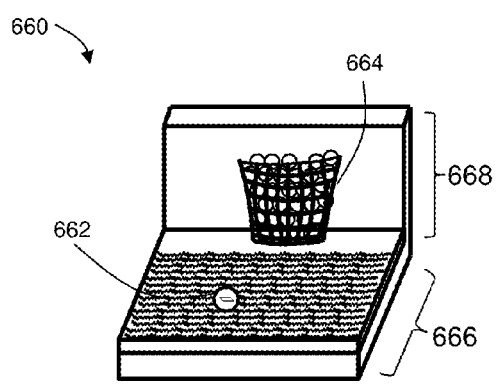
FIG. 6C shows a RFID reader for identifying a ball at the tee box.

Referring to FIG. 6C, an illustrative RFID reader 660 for identifying a ball at the tee box is shown. When the player arrives at the tee box, the player takes a ball 662 from the bucket 664 and places it on a tee in preparation to strike the ball onto the range. The ball may be identified by a RFID reader 666 when the ball is placed on the tee. The reader may be located, for example, in the platform below the tee. In some embodiments, each ball in the bucket is identified when the bucket is located in the tee box. In some embodiments, a reader for simultaneously identifying the collection of golf balls is located at the tee area. The reader for identifying all of the balls in a bucket may be located in a vertical panel 668 located adjacent to a designated area for resting bucket 664, or the reader may be located in a platform supporting the bucket.

Figure 7:
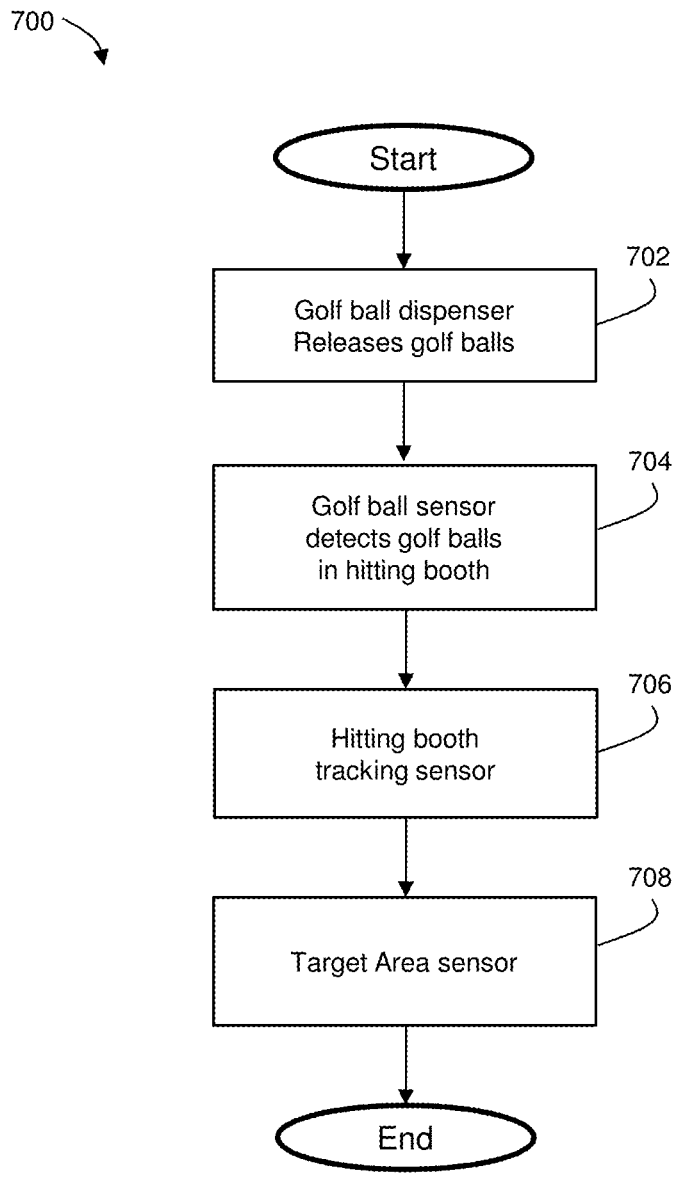
FIG. 7 shows a method for tracking golf balls at a driving range.

Referring to FIG. 7, there is shown an illustrative method 700 for tracking golf balls at a driving range. The method begins at block 702 where the golf ball dispenser 602 receives a command to release a quantity of golf balls into a bucket or on to the driving range mat in booth 420.

The method proceeds to block 704 where a reader identifies the balls dispensed. In one embodiment, the golf balls are deposited into a bucket and a reader reads all the golf balls that are dispensed in the bucket. The reader may also be disposed in the hitting both and reads each dispensed golf ball. The illustrative reader generates a timestamp that is communicated to the database server, when each golf ball is dispensed.

By way of example and not of limitation, the reader that identifies the balls being dispensed is an RFID reader configured to read an RFID golf ball, as described in the patent application entitled RFID GOLF BALL TARGET SYSTEM AND METHOD filed on Oct. 20, 2011.

At block 706 a tracking sensor in the booth is configured to track the golf ball when it is struck by the player. As described above, the illustrative tracking module 432 (shown in FIG. 4B) includes a 3D Doppler radar sensor such that when the user makes contact with the ball, the radar system will start to track the golf ball and display its flight path on the screen, as shown in FIG. 2. The illustrative output from the 3D Doppler radar system may include ball speed 206, club speed 204 and distance 208.

At block 708, a target area sensor is configured to determine if the golf ball has landed in the target area. The determination of landing in a target can vary and would be depend on the game, type of target, bets, side bets, or other such game parameters that affect the determination of a qualified target. For example, if the target may be an above-ground target, an in-ground target, and an on-ground target. An above-ground target may be a movable target with one or more target funnels that receive the golf balls which are released to the ground surface. An in-ground target has the target at ground level and an underground cavity that receives the golf balls, so the golf balls that hit the target fall into the underground cavity. An on-ground target is simply a target disposed on the ground surface.

By way of example and not of limitation, a plurality of camera sensors that operate at high frame rates may be used to monitor an on-ground target area. FIG. 7 presents the illustrative combination of the tracking module (located at the booth), the camera sensor(s) configured to monitor the target area, and golf ball sensor configured to detect the ball at a particular booth.

The inputs from the illustrative three sensors are combined and time synchronized with information about the player, the booth, and the golf ball. A variety of different data may be obtained from the booth and communicated to the illustrative database server which can then time synchronize with other sensor inputs, as described above.

Figure 8:
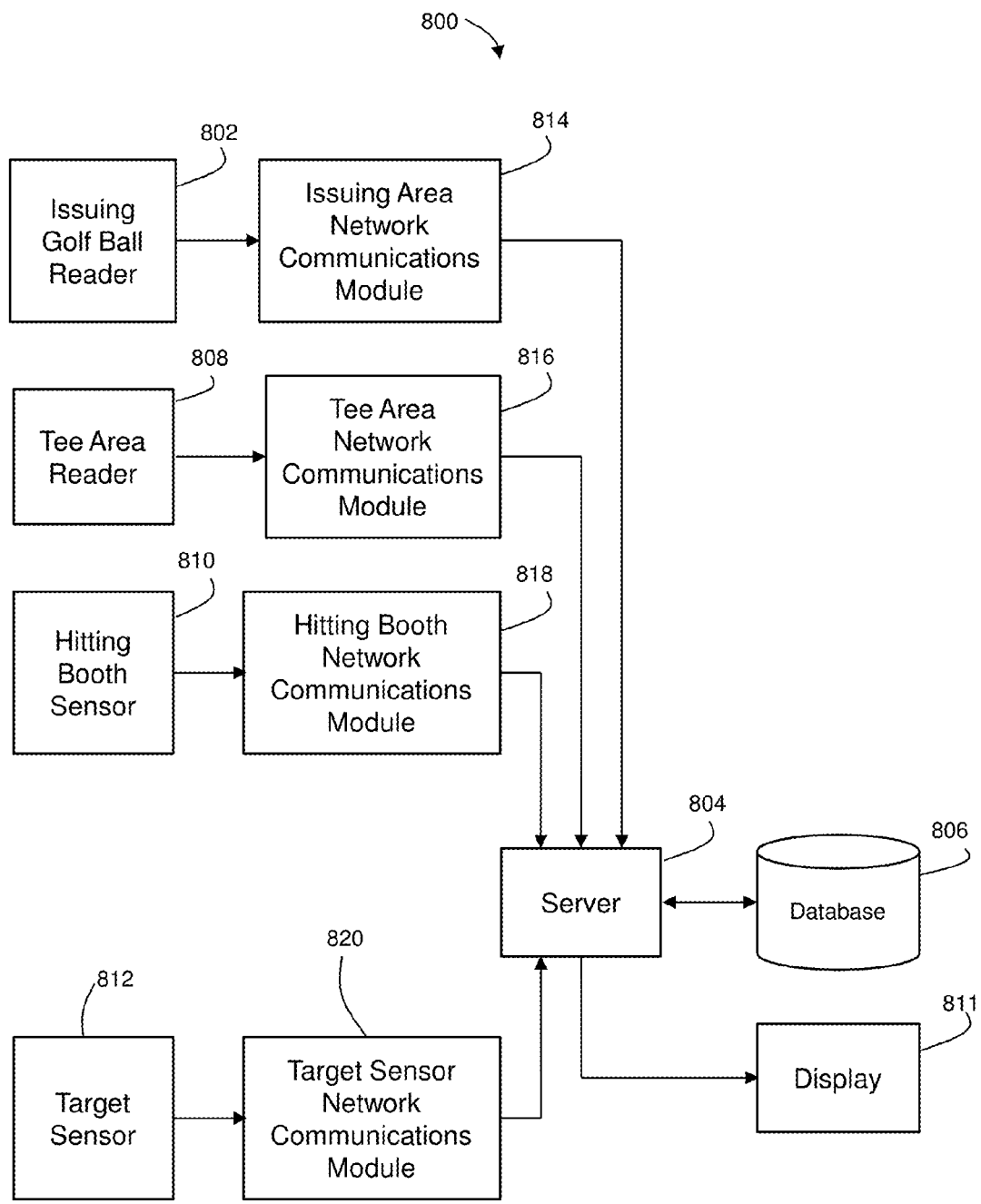
FIG. 8 shows a golf range target system.

Referring to FIG. 8, an illustrative system diagram 800 for the golf range target system is shown. In the illustrative embodiment, the player obtains a set of golf balls dispensed by a golf ball dispenser. The golf balls may be first issued to the player to validate the number of golf balls and validate the authenticity of the golf balls by tracking the identifiers for each of the golf balls and making sure that one unique identifier is associated with each golf ball. The need for an issuing reader arises to avoid player cheating, in which a player may attempt to replicate the same unique ID for a plurality of golf balls, and thus increase their odds of winning during a game of skill, game of chance, group play, or some combination thereof.

In the illustrative embodiment, the golf balls read by the issuing golf ball reader include embedded RFID tags. Alternatively, the golf balls may include unique bar codes, QR codes, or other such codes that can be used to distinguish the golf balls.

An issuing area reader 802 may be a component of an illustrative golf ball dispenser, or may be located elsewhere at the driving range. The golf balls are placed in or dispensed to a designated area proximate to the issuing area reader 802. Each golf ball has a unique identification that for the illustrative embodiment is represented by an RFID tag.

The issuing area reader 802 reads the unique identification from each of the plurality of balls. The issuing area reader is communicatively coupled to an issuing area network communications module 814. The network communications module is configured to manage communications between the issuing golf ball reader and the server 804. The network may be, for example, a local area network (LAN) or a wide area network (WAN) such as the Internet.

The identification of each golf ball in the player's set of golf balls, as detected by the issuing area reader 802, is sent to server 804 via issuing area first network communications module 814. The server creates an entry in database 806 associating the identifications of the plurality of RFID golf balls with a unique identification associated with the player. The server and database 806 may be located on site at the illustrative driving range. In some embodiments, the server or database or both are located off site, i.e. cloud deployment, and receive communications from the RFID readers over, for example, a LAN or WAN. The server and database may be located in the same physical computer. Alternatively, an on-site server may be configured to communicate with an off-site server and database. Multiple databases may be used in conjunction with the one or more servers located on site, off site, or both. A multiple-site driving range establishment may use multiple servers to allow information to be collected from and distributed to the multiple sites.

There may be occasions when a player wishes to play without having to utilize the issued RFID golf balls and may just want to play with standard golf balls. As such, the player would be excluded from having to access the issuing golf ball reader.

The illustrative database 806 may be configured to store additional information associated with a player including, but not limited to, a record of the player's play history at the driving range, transactional information, and account information. The player ID and other information associated with the player may be stored on a card having a magnetic stripe or other readable media. Alternatively, the player may be issued a PIN number or username and password combination associated with the player ID. In some embodiments, a temporary player account is created for short term use of the driving range. The player may receive a paper voucher indicating a temporary player ID in human readable and/or barcode form. A paperless system for issuing a temporary player ID may involve communicating the player ID to the player visually or audibly, or associating a particular tee box with the player's set of RFID golf balls.

At the illustrative booth, the player may physically pick up a golf ball and place it on a tee in preparation for hitting the ball onto the driving range. Alternatively, the booth may include a golf ball dispenser that dispenses a golf ball on to a mat. In yet another alternative embodiment, the golf ball dispenser may dispense a golf ball on a tee and so the player does not have to bend over and place a golf ball on the tee.

In the illustrative embodiment, each golf ball is identified before the player strikes the ball. The golf ball is identified by a tee area reader 808 that communicates the golf ball information to server 804 via a tee area network communications module 816, which is communicatively coupled to the tee area reader. By way of example and not of limitation, the golf ball identification for an RFID golf ball is read by the tee area reader 808 and is communicated to tee area network communications module 816, which is communicatively coupled to the server 804. The illustrative RFID ball may be read when the ball is placed on the tee (on arrival at the tee area) or when the ball is struck off of the tee (on departure from the tee area). In some embodiments, the identification of the RFID golf ball is communicated when the ball is placed on the tee and again when it is struck from the tee area.

The booth sensor 810 includes a tracking module that is configured to track a single ball through a group of golf balls. The illustrative tracking module may employ a phase array Doppler radar device having predictive and stochastic algorithms. Each bay or booth includes a tracking module that allows tracking a golf ball, the player, and the golf club. By way of example and not of limitation, the tracking module tracks a golf club speed, a ball speed, a ball travel distance. The booth sensor 810 may also be a camera sensor or other such sensor. The camera sensor may be used to generate a visual record of the player's swing or to further assist in tracking the golf ball.

The booth sensor is communicatively coupled to the booth network communications module 818, which is communicatively coupled to the server 804. The server 804 is communicatively coupled to each booth sensor, e.g. tracking module. By way of example, the database 806 stores information tracking module information such as the golf club speed, the ball speed, and the ball travel distance for each player.

After the player strikes the golf ball, the target sensor 812 determines whether the golf ball has landed in the target area. By way of example and not of limitation, the target sensor includes a plurality of camera sensors that operate at high frame rates, which are used to monitor the target area. The illustrative combination of the tracking module (located at the booth) and the camera sensor(s) (located near the target area) determine the location of the golf ball by combining the output from both sensors. In the illustrative embodiment, at least two cameras surround the target and enable a 3D analysis of the camera images.

In the illustrative embodiment, the inputs from the two sensors are time synchronized at the server 804 with information about the player, the booth, and the golf ball. More generally, a variety of different data may be obtained from the booth and communicated to the illustrative database server 804 which can then time synchronize with other sensor inputs.

For example, the booth may collect information such as unique player ID, player loyalty rewards card information, golf ball RFID tag, or other such unique ID for the golf ball. Additionally, the booth may include tracking module information that is also communicated to the server. The server may also receive camera sensor input associated with the target. Thus, the information from the booth and the target area can be combined at the server and can be viewed contemporaneously and reviewed at later date for regulatory compliance purposes, which may be required for wagering games or games of chance.

In an alternative embodiment, an RFID golf ball is dispensed on to a mat that has an RFID reader capable of reading the RFID golf ball. The reader communicates the golf ball ID to the server. The player strikes the ball at an above-ground target. The RFID reader is polling by repeatedly reading the RFID golf ball and when the ball is struck, the RFID reader records the time when RFID golf ball was not readable. Another illustrative sensor corresponding to the target then reads the RFID golf ball hitting the target and this information is communicated to the server. The illustrative target sensor may be a golf ball reader, e.g. RFID reader, or may be a camera sensor, or a combination thereof. A timestamp associated with the time the ball left the tee may be sent to the server. The timestamp may be generated by the second RFID reader integrated with the target area when it determines that the RFID golf ball has left the tee. Alternatively, the timestamp may be generated by beam interruption detection or similar method. Information such as whether the RFID golf ball landed in a target, a point tally, distance traveled by a ball, timestamp associated with each time the ball is hit, and statistics for a single driving range session or multiple driving range sessions, may be presented to the player in various ways. For example, the information may be sent from server 804 to a display 811. The display may be, for example, a display mounted in the tee area or in another part of the driving range. In other embodiments, the information may be made available to the player for display on a handheld device or personal computer.

In some embodiments, no tee area reader is used. In such embodiments, the golf balls are associated with a player by the issue area reader and read at the target area sensor 812.

In other embodiments, no issue area RFID reader is used. The golf balls are associated with a player at the tee area and read at the target area sensor 812.

Figure 9:
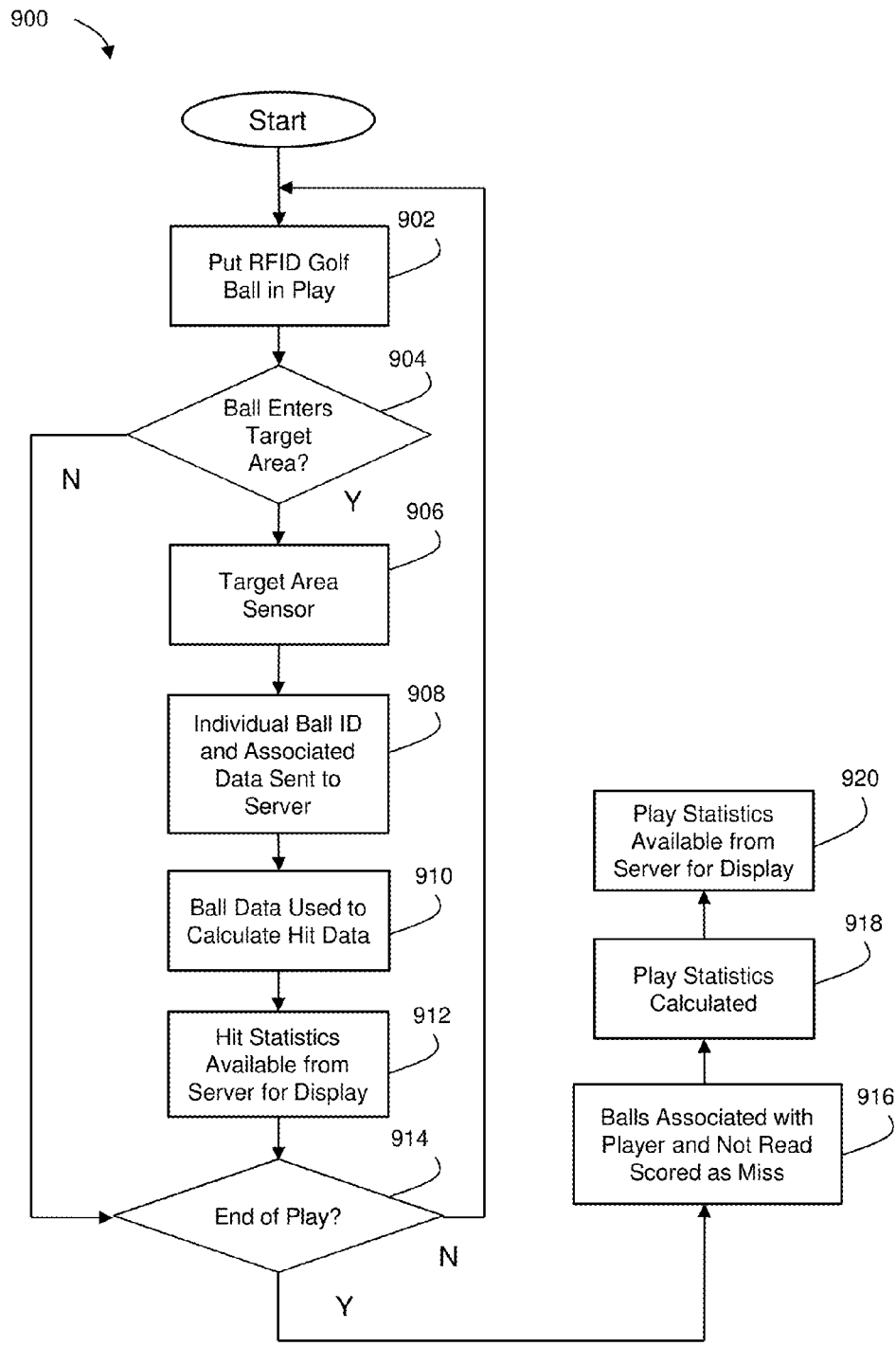
FIG. 9 shows a method for scoring driving range play using on-ground targets.

Referring to FIG. 9, an illustrative method 900 for scoring driving range play using on-ground targets is shown. The method begins at block 902, at which the golf ball is put into play by a player hitting the ball on to the driving range. In some embodiments, the golf ball is associated with a player identification prior to being put into play, for example, when an issuing area RFID reader identifies balls dispensed into a booth 400 (shown in FIG. 4A).

The method proceeds to decision diamond 904 where it is determined whether the golf ball has entered a target area, as shown in FIG. 2. If the golf ball has entered the target area the method proceeds to block 906 where the golf ball is identified by the target area sensor as described above.

At block 908, the golf ball target area data are communicated to server 804, as described in FIG. 8. The associated data may include an identification of the target, a location of the target as determined by a GPS receiver associated with the target, and a time at which the ball landed in the target.

The method proceeds to block 910 where ball data may be used by the server to calculate data corresponding to a particular hit. For example, the speed, distance, normalized distance, accuracy, point value, and cost (e.g., on a driving range used for gaming) associated with a striking a ball may be determined.

At block 912, the data generated by the server for having struck a particular ball may be made available for display to the player. By way of example and not of limitation, the player may be able to view the statistics on a display located at the driving range or on a handset or personal computer having an application configured to communicate with server 804.

At decision diamond 914, it is determined whether play has ended. In the illustrative embodiment, it may be determined that play has ended if all of the RFID golf balls associated with a player have passed the second reader (and thus were struck from the golf mat on to the driving range). If play has ended, the method proceeds to optional block 916 where the server determines that all RFID golf balls that passed the second reader but were not read at a target missed all targets, and are thus scored as "miss."

At block 918, the server calculates statistical or summary information applicable to all balls played in the session. For example, statistical or summary information pertaining to distance, speed, accuracy, point value, cost, and missed balls may be calculated by the server.

At block 920, the statistics or summary information is made available for display to the player, for example, on a display at the driving range, a handset, or a personal computer.

It is to be understood that the detailed description of illustrative embodiments are provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A golf ball range target system comprising:
    a golf target having a known geographic location that includes at least one golf target area;
    a golf ball dispenser that houses a plurality of golf balls;
    at least one golf ball associated with a particular player;
    a radar tracking module that determines a golf ball flight trajectory for the golf ball associated with the particular player, wherein the golf ball flight trajectory includes a golf ball landing area;
    a client computer presents the golf ball trajectory, the golf target on a display and a plurality of player information associated with the player; and
    a game of skill associated with hitting a golf ball at a target area and awarding a skill based prize for hitting the ball at the target area;
    at least one game of chance that includes a game session for the game of chance that is initiated when the game of skill is initiated;
    the game of chance including a random game session result;
    a game of chance prize that is awarded according to the random game session result; and
    wherein the game of chance prize is awarded only when the golf ball misses the target area.

2. The golf ball range target system of claim 1 wherein the client computer includes a touch screen display.

3. The golf ball range target system of claim 1 wherein each golf ball includes an RFID tag and the target area includes an RFID reader that reads the golf ball with the RFID tag.

4. The golf ball range target system of claim 1 further comprising a server communicatively coupled to the radar tracking module and the client computer, the server further comprises a database that stores at least one of a club speed, a ball speed, a ball travel distance, the golf ball trajectory, and the geographic location of the target area.

5. A golf ball range target system comprising:
    a plurality of golf target areas;
    a golf ball dispenser houses a plurality of golf balls;
    at least one golf ball associated with a particular player;
    a plurality of golf driving range booths that each includes a mat, wherein the golf ball is dispensed on the mat;
    a plurality of radar tracking modules, in which each golf driving range booth includes a radar tracking module that tracks each golf ball dispensed on the mat;
    the radar tracking module tracks a golf club speed, a ball speed, a ball travel distance;
    a reader reads at least one of a near-field communications (NFC) chip, a radio-frequency identification chip, a mag stripe card, and a wireless device;
    a plurality of client computers, in which each client computer is associated with each golf driving range booth, each client computer presents a plurality of player information associated with the particular player disposed in the particular golf driving range booth, wherein each client computer displays at least one of the golf club speed, the ball speed and the ball travel distance;
    a server communicatively coupled to each radar tracking module and each client computer, the server further comprises a database that stores at least one of the golf club speed, the ball speed, and the ball travel distance for each player; and
    a game of skill associated with hitting a golf ball at the golf target areas and awarding a skill based prize for hitting the ball at one of the plurality of target areas;
    at least one game of chance that includes a game session for the game of chance that is initiated when the game of skill is initiated;
    the game of chance including a random game session result;
    a game of chance prize that is awarded according to the random game session result; and
    wherein the game of chance prize is awarded only when the golf ball misses the target areas.

6. The golf ball range target system of claim 5 wherein each golf ball includes an RFID tag and each of the target areas includes an RFID reader that reads the golf ball with the RFID tag.

7. The golf ball range target system of claim 5 further comprising a wireless network communicatively coupled to each client computer and each radar tracking module.

8. The golf ball range target system of claim 5 further comprising a game of chance wager and a game of skill wager.

9. The golf ball range target system of claim 5 wherein the plurality of golf target areas further comprises a plurality of movable surface-mounted concentric circles.

10. The golf ball range target system of claim 5 further comprising a plurality of movable surface-mounted hazards.

11. A golf ball range target system comprising:
an RFID golf ball that includes an RFID tag;
a unique RFID golf ball identifier associated with the RFID golf ball;
a golf ball dispenser that houses a plurality of RFID golf balls;
a plurality of golf driving range booths that each includes a mat, wherein the RFID golf ball is dispensed on the mat;
a plurality of radar tracking modules, in which each golf driving range booth includes a radar tracking module that tracks each golf ball dispensed on the mat, the radar tracking module tracks a golf club speed, a ball speed, a ball travel distance;
an issuing area RFID reader disposed within the golf driving range booth and associated with the golf dispenser, the issuing area RFID reader reads the plurality of RFID golf balls that are associated with a player, the issuing area RFID reader communicatively coupled to a network communications module;
a plurality of client computers, in which each client computer is associated with each golf driving range booth, each client computer presents a plurality of player information associated with the particular player disposed in the particular golf driving range booth, wherein each client computer displays at least one of the golf club speed, the ball speed and the ball travel distance;
a server communicatively coupled to each radar tracking module and each client computer, the server further comprises a database that stores at least one of the golf club speed, the ball speed, and the ball travel distance for each player;
a plurality of target areas, in which each target area has a known geographic location and wherein each target area reads the RFID golf balls;
a game of skill associated with hitting the RFID golf ball at the golf target areas and awarding a skill based prize for hitting the RFID ball at one of the plurality of target areas;
at least one game of chance that includes a game session for the game of chance that is initiated when the game of skill is initiated;
the game of chance including a random game session result;
a game of chance prize that is awarded according to the random game session result; and
wherein the game of chance prize is awarded only when the golf ball misses the target areas.

12. The golf ball range target system of claim 11 wherein each client computer further comprises a tablet computer having a touch screen display.

13. The golf ball range target system of claim 11 further comprising a wireless network communicatively coupled to each client computer and each radar tracking module.

14. The golf ball range target system of claim 11 further comprising a game of chance wager and a game of skill wager.

15. The golf ball range target system of claim 11 wherein the plurality of golf target areas further comprises a plurality of movable surface-mounted concentric circles.

16. The golf ball range target system of claim 11 further comprising a plurality of movable surface-mounted hazards.

17. The golf ball range target system of claim 11 wherein the game of chance includes a spinning wheel, in which the prize is awarded according to the random game result of the spinning wheel.

18. The golf ball range target system of claim 5 wherein the game of chance includes a spinning wheel, in which the prize is awarded according to the random game result of the spinning wheel.

19. The golf ball range target system of claim 1 wherein the game of chance includes a spinning wheel, in which the prize is awarded according to the random game result of the spinning wheel.

20. The golf ball range target system of claim 1 wherein the game of chance includes a slot machine reel that spins.

21. The golf ball range target system of claim 1 wherein the game of chance includes a bingo game.

* * * * *